United States Patent
Zhang et al.

(10) Patent No.: US 12,515,283 B2
(45) Date of Patent: Jan. 6, 2026

(54) METHOD FOR PROCESSING MORTISE OF SMALL-SIZE SUPERALLOY TURBINE DISK USING LASER SHOCK PEENING

(71) Applicant: GUANGDONG LASER PEENING TECHNOLOGY CO., LTD, Foshan (CN)

(72) Inventors: Yongkang Zhang, Foshan (CN); Chaohui Lin, Foshan (CN); Xiaoming Shan, Foshan (CN); Xiaojun Guo, Foshan (CN); Jun Liu, Foshan (CN); Jianxin Liu, Foshan (CN); Yuzhou Li, Foshan (CN); Qingyuan Wu, Foshan (CN)

(73) Assignee: Guangdong University of Technology, Guangzhou (CN)

( * ) Notice: Subject to any disclaimer, the term of this patent is extended or adjusted under 35 U.S.C. 154(b) by 1050 days.

(21) Appl. No.: 17/546,340

(22) Filed: Dec. 9, 2021

(65) Prior Publication Data
US 2022/0097182 A1   Mar. 31, 2022

Related U.S. Application Data

(63) Continuation of application No. PCT/CN2020/082781, filed on Apr. 1, 2020.

(30) Foreign Application Priority Data

Jun. 14, 2019   (CN) .......................... 201910518097.8

(51) Int. Cl.
*B23K 37/02*   (2006.01)
*B23K 26/356*  (2014.01)
(Continued)

(52) U.S. Cl.
CPC ........ *B23K 37/0258* (2013.01); *B23K 26/356* (2015.10); *B23K 26/702* (2015.10); *C21D 10/005* (2013.01)

(58) Field of Classification Search
CPC ... B23K 26/352; B23K 26/356; B23K 26/702
(Continued)

(56) References Cited

FOREIGN PATENT DOCUMENTS

| CN | 103898297 A | * | 7/2014 |
| CN | 103898313 A | * | 7/2014 |

(Continued)

OTHER PUBLICATIONS

Liu Jun et al. "Research on Key Technology of Laser Shock Strengthening for Small-size Turbine Disk Groove." Electromachining & Mould, No. 6, Dec. 20, 2019(Dec. 20, 2019).

*Primary Examiner* — Steven W Crabb
*Assistant Examiner* — Alba T Rosario-Aponte

(57) ABSTRACT

A method for processing a mortise of a small-size superalloy turbine disk using laser shock peening A laser shock peening (LSP) parameter of a laser shock peening (LSP) robot is designed. A spatial data of a motion trajectory of the LSP robot for a laser shock peening area of mortise teeth of the first mortise is found and recorded using a robot simulation system software to generate a trajectory program of the robot for the first mortise. Then a rotation program of an end of an arm of the LSP robot is written according to an included angle between two adjacent mortises to generate a trajectory program of the robot for all mortises of the turbine disk. Finally, the turbine disk is processed by laser shock peening.

3 Claims, 6 Drawing Sheets

(51) Int. Cl.
*B23K 26/70* (2014.01)
*C21D 10/00* (2006.01)
(58) Field of Classification Search
USPC ..................................................... 219/121.85
See application file for complete search history.

(56) References Cited

FOREIGN PATENT DOCUMENTS

| | | | | | |
|---|---|---|---|---|---|
| CN | 105385839 | A | | 3/2016 | |
| CN | 106141425 | A | | 11/2016 | |
| CN | 106191422 | A | | 12/2016 | |
| CN | 106826248 | A | | 6/2017 | |
| CN | 107143380 | A | * | 9/2017 | ............... F01D 5/02 |
| CN | 108411102 | A | * | 8/2018 | ........... C21D 10/005 |
| CN | 108754490 | A | | 11/2018 | |
| CN | 109504849 | A | | 3/2019 | |
| CN | 109706309 | A | * | 5/2019 | |
| CN | 110438332 | A | | 11/2019 | |
| WO | 2019051616 | A1 | | 3/2019 | |

* cited by examiner

METHOD FOR PROCESSING MORTISE OF SMALL-SIZE SUPERALLOY TURBINE DISK USING LASER SHOCK PEENING

CROSS-REFERENCE TO RELATED APPLICATIONS

This application is a continuation of International Patent Application No. PCT/CN2020/082781, filed on Apr. 1, 2020, which claims the benefit of priority from Chinese Patent Application No. 201910518097.8, filed on Jun. 14, 2019. The content of the aforementioned application, including any intervening amendments thereto, is incorporated herein by reference in its entirety.

TECHNICAL FIELD

The present application relates to laser shock peening, and more particularly to a method for processing a mortise of a small-size superalloy turbine disk using laser shock peening.

BACKGROUND

During the operation of an aeroengine, the turbine disk is mainly subjected to centrifugal stress and thermal stress, both of which cyclically varies with the variation in the working condition of the engine. Considering that the turbine disk is also subjected to a large residual stress, and the turbine disk has a relatively complicated shape, some high stress areas with local stress concentration often occur in use. Under the combined action of the load of centrifugal stress, thermal stress and local stress, the turbine disk is prone to fatigue failure.

Compared with the previous surface treatment techniques, the laser shock peening technique can not only cause plastic deformation at the surface of the component and generate greater residual compressive stress through the shock wave induced by the laser, but also cause the variation of the micro structure inside the component, significantly improving the fatigue resistance, wear resistance, and corrosion resistance. After years of exploration and research, the laser shock peening technique has been widely applied in the field of the aeroengine.

However, there are some small-size and structurally-complex turbine disks in some types of aeroengines, and there are still many problems remaining to be solved in the laser shock peening of these small-size components, especially the mortise of the turbine disk. The mortise of the turbine disk is subjected to complicated stress, and different areas of the mortise vary in the stress and stress concentration. Moreover, the mortise of the turbine disk has a complicated structure, and a width of the mortise is less than 6 mm, which leads to poor beam accessibility, thereby leading to considerable difficulty in implementing the laser shock peening.

SUMMARY

An object of this application is to provide a method for processing a mortise of a small-size superalloy turbine disk using laser shock peening to solve the technical problem of poor beam accessibility in the prior art.

Technical solutions of this application are described as follows.

This application provides a method for processing mortises of a superalloy turbine disk using laser shock peening, comprising:

(S1) according to a structural characteristic and a dimensional data of the mortises of the superalloy turbine disk, designing a laser shock peening (LSP) parameter of a laser shock peening (LSP) robot, wherein different LSP parameters and different oblique beam incident angles are adopted for positions with different heights on a mortise tooth in the same mortise;

(S2) inputting a spatial position of a model of the LSP robot, a model of a clamp and a model of the superalloy turbine disk into a simulation system software of the LSP robot according to a spatial position data of the LSP robot, the clamp and the superalloy turbine disk, wherein the simulation system software comprises the model of the LSP robot, the model of the clamp and the model of the superalloy turbine disk; the clamp is arranged at an end of an arm of the LSP robot; the clamp is configured to clamp the superalloy turbine disk; and the LSP robot is configured to drive the clamp;

(S3) finding and recording a spatial data of a motion trajectory of the LSP robot for a laser shock peening area of all mortise teeth of a first mortise to generate a trajectory program of the LSP robot for the first mortise using the simulation system software of the LSP robot according to the LSP parameter of the LSP robot designed in step (S1);

(S4) calculating an included angle between two adjacent mortises according to the number of the mortises of the superalloy turbine disk; and writing a rotation program of the end of the arm of the LSP robot according to the included angle;

(S5) subjecting the trajectory program of the LSP robot generated in step (S3) and the rotation program of the end of the arm of the LSP robot to permutation and combination to generate a trajectory program of the LSP robot for all mortises of the superalloy turbine disk;

(S6) processing, by a laser, the mortises of the superalloy turbine disk by using laser shock peening; wherein a LSP parameter of the laser is adjusted for positions with different heights on the mortise tooth in each of the mortises of the superalloy turbine disk, and the LSP parameter of the laser comprises a laser energy intensity, a laser spot size, a laser pulse width and a laser pulse frequency; and (S7) processing the mortises of the superalloy turbine disk by laser shock peening according to the trajectory program of the LSP robot obtained in step (S5) and the LSP parameter of the laser.

In an embodiment, a spatial data of a motion trajectory of the LSP robot for a laser shock peening area of a mortise groove of the mortises is determined by using a perpendicular incident laser beam.

In an embodiment, the clamp and the superalloy turbine disk are kept fixed during the laser shock peening.

Compared to the prior art, the present disclosure has the following beneficial effects.

In the method provided herein, the LSP parameter and the oblique incident angle of the laser beam are adjusted for positions with different heights on a mortise tooth in the same mortise to realize the laser shock peening treatment of various small-size and structurally-complex turbine disk with narrow space and solve the problem of poor laser beam accessibility during the LSP treatment of the turbine disk. Moreover, the LSP parameter for each LSP area can be accurately quantified, which realizes the variable parameter laser shock peening and improves the processing flexibility.

BRIEF DESCRIPTION OF THE DRAWINGS

This application will be further described in detail below with reference to the accompanying drawings and embodiments.

Figure 1:
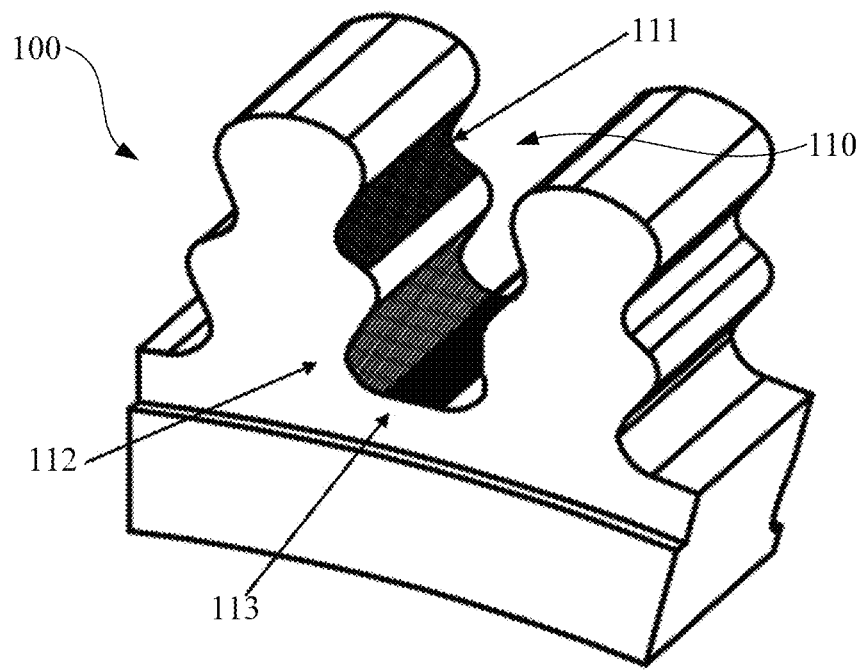
FIG. 1 is a schematic diagram of an area to be processed by laser shock peening on a mortise of a turbine disk according to an embodiment of the present application.

In the drawings, 100: turbine disk; 110: mortise; 111: first mortise tooth part; 112: second mortise tooth part; 113: mortise groove; 200: laser beam; 210: laser; 300: laser shock peening robot; and 310: clamp.

DETAILED DESCRIPTION OF EMBODIMENTS

In this embodiment, a method for processing mortises of a small-size superalloy turbine disk using laser shock peening is provided, which includes the following steps.

(S1) According to a structural characteristic and a dimensional data of the mortises 110 of the superalloy turbine disk 100, a laser shock peening (LSP) parameter of a laser shock peening (LSP) robot 300 is designed to determine an area to be processed by laser shock peening of the mortise 110, as shown in FIG. 1

Different LSP parameters and different oblique beam incident angles are adopted for positions with different heights on a mortise tooth in the same mortise 110. The mortise 110 is divided into a front part and a rear part along a width direction of the mortise tooth.

In this embodiment, considering that the mortise 110 of the turbine disk 100 has a complicated structure, different laser shock peening parameters and different oblique beam incident angles are adopted for positions with different heights on a mortise tooth in the same mortise 110. Moreover, considering that it fails to process all areas along a width direction of the mortise tooth at a single incident direction while avoiding the interference due to the narrow space inside the mortise 110 and the small incident angle of the laser beam 200, the mortise 110 is divided into a front part and a rear part along a width direction of the mortise tooth, and the front part and the rear part are respectively processed by laser shock peening.

In this embodiment, the area to be processed of the mortise 110 is divided into a first mortise tooth part 111 close to a top of the mortise tooth of the mortise 110, a second mortise tooth part 112 close to a root of the mortise tooth of the mortise 110, and a mortise groove 113. In other embodiments, the area to be processed can be divided into more parts.

Figure 2:
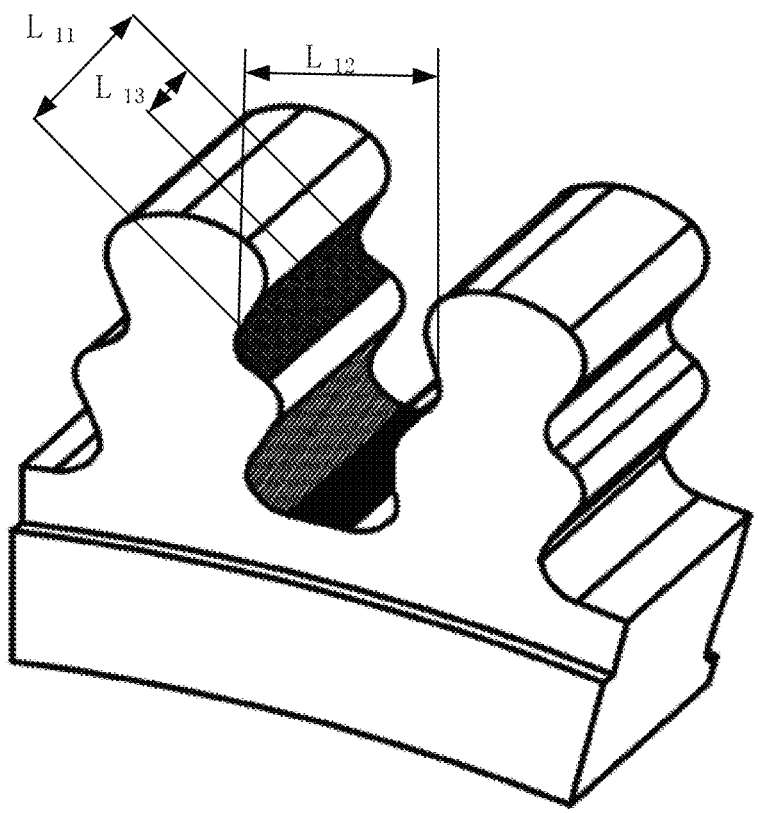
FIG. 2 is a schematic diagram of an area to be processed by laser shock peening on a first mortise tooth part of the turbine disk according to an embodiment of the present application.
Figure 5:
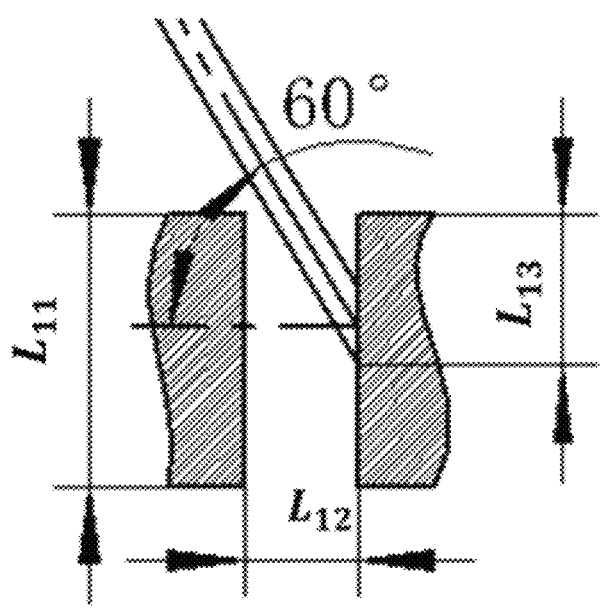
FIG. 5 schematically shows the first mortise tooth part of the turbine disk irradiated by a laser beam.
Figure 6:
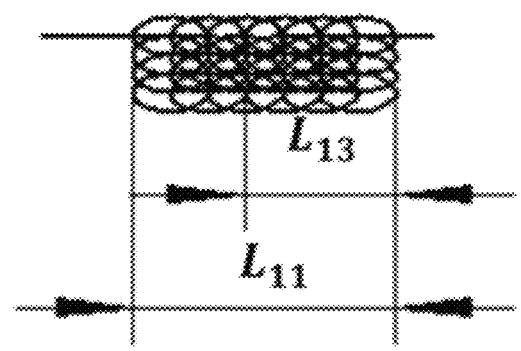
FIG. 6 schematically illustrates lapping of elliptical spots on the first mortise tooth part of the turbine disk according to an embodiment of the present application.

Referring to an embodiment shown in FIGS. 1 and 2, a laser spot lap rate on the first mortise tooth part 111 is determined to be 50% on the premise that the laser shock peening can be completed. The 50% laser spot lap rate can ensure that all areas to be processed on the first mortise tooth part 111 can be covered by laser beam, where the projection of the laser beam 200 emitted by the laser 210 on the mortise tooth of the mortise 110 is the laser spot, and the overlapping ratio of two adjacent laser spots is the laser spot overlap rate (if the two adjacent laser spots completely overlap, the laser spot overlap rate is 100%). The optimal oblique shock angle α for the first mortise tooth part 111 is determined to be 60°, according to a space length L 12 of the mortise 110 corresponds to the first mortise tooth part 111, as shown in FIG. 5, on the premise of preventing the interference of the laser beam 200. The length of the front LSP area of the first mortise tooth part 111 is $L_{13}$, which is exactly half the length $L_{11}$ of the mortise 110, and the length of the rear LSP area is $L_{11}$-$L_{13}$. The schematic diagram of the lapping of elliptical spots in LSP is shown in FIG. 6.

Figure 3:
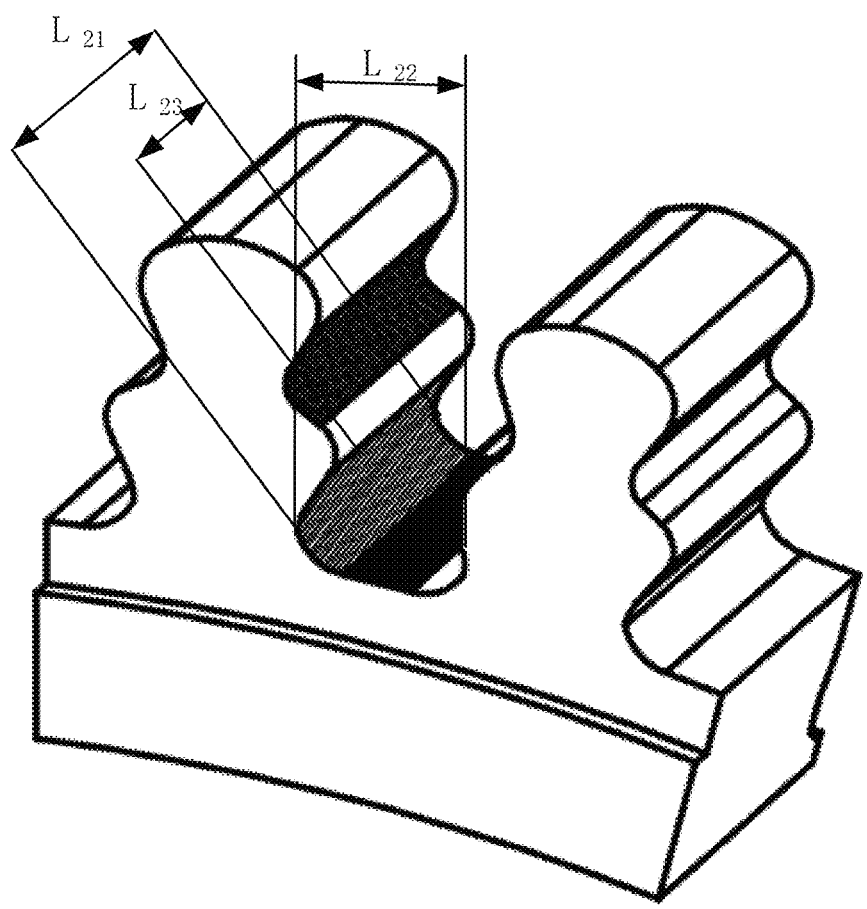
FIG. 3 is a schematic diagram of an area to be processed by laser shock peening on a second mortise tooth part of the turbine disk according to an embodiment of the present application.
Figure 7:
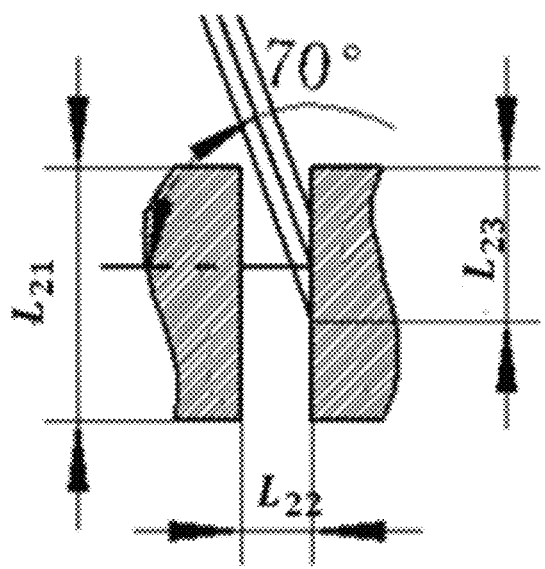
FIG. 7 schematically shows the second mortise tooth part of the turbine disk irradiated by the laser beam.
Figure 8:
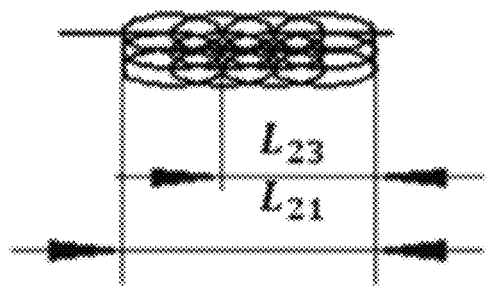
FIG. 8 schematically shows lapping of elliptical spots on the second mortise tooth part of the turbine disk.

Referring to an embodiment shown in FIGS. 1 and 3, a laser spot lap rate on the second mortise tooth part 112 is determined to be 50%, on the premise that the laser shock peening can be completed. The 50% laser spot overlap rate can ensure that all areas to be processed on the second mortise tooth part 112 can be covered by laser beam. The optimal oblique shock angle α for the second mortise tooth part 112 is determined to be 70°, according to a space length $L_{22}$ of the mortise 110 corresponds to the second mortise tooth part 112 as shown in FIG. 7, on the premise of preventing the interference of the laser beam 200. The length of the front LSP area of the second mortise tooth part 112 is $L_{23}$, which is exactly half the length $L_{21}$ of the mortise 110, and the length of the rear LSP area is $L_{21}$-$L_{23}$. The schematic diagram of the lapping of the elliptical spots in LSP is shown in FIG. 8.

Figure 4:
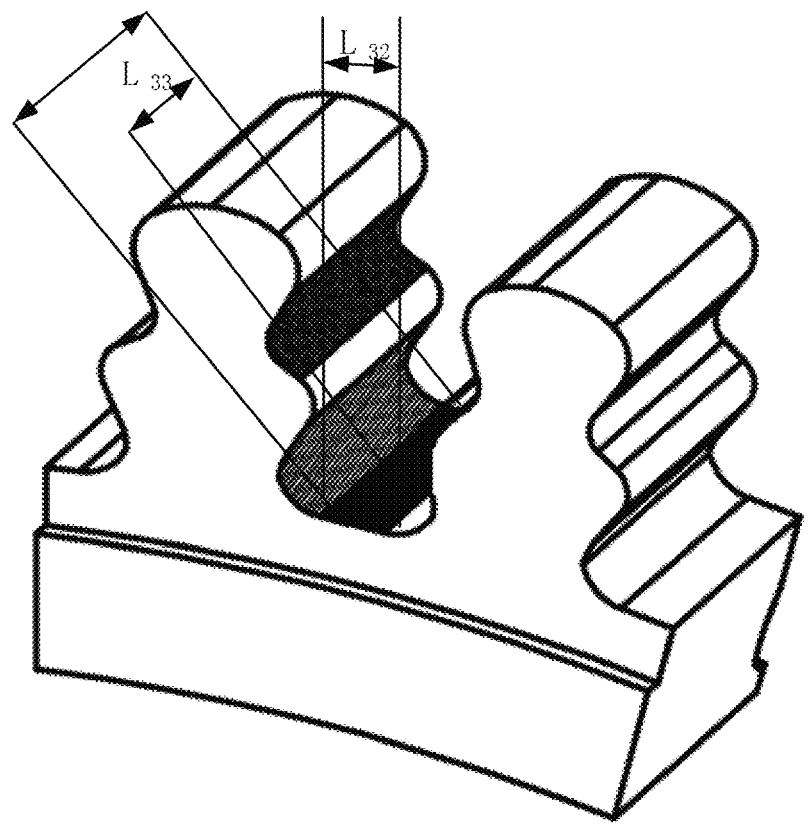
FIG. 4 is a schematic diagram of an area to be processed by laser shock peening on a mortise groove of the turbine disk according to an embodiment of the present application.
Figure 9:
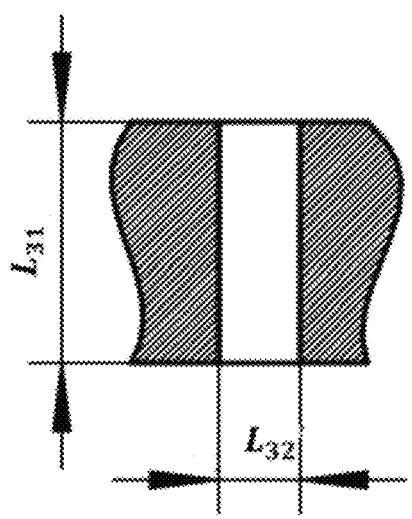
FIG. 9 shows a mortise groove of the turbine disk irradiated by the laser beam.
Figure 10:
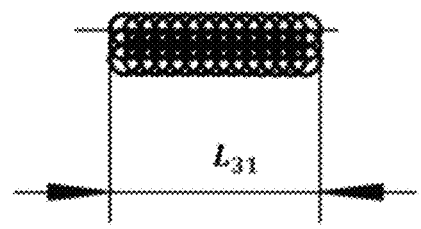
FIG. 10 schematically depicts lapping of elliptical spots on the mortise groove of the turbine disk.

Referring to an embodiment shown in FIGS. 1 and 4, for the mortise groove 113 of the mortise 110, a spatial data of the motion trajectory of the LSP robot 300 for a laser shock peening area of the mortise groove 113 of the mortises 110 is determined by using a perpendicular incident laser beam, as shown in FIGS. 9 and 10, where $L_{31}$ is a length of the mortise 110, and $L_{32}$ is a space length of the mortise groove 113 of the mortise 110.

Figure 12:
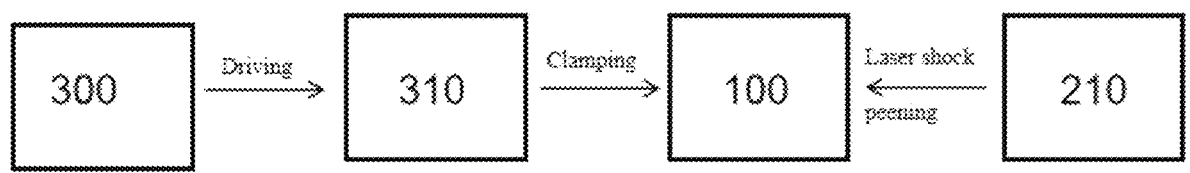
FIG. 12 schematically shows the turbine disk, a laser, a laser shock peening robot, and a clamp according to an embodiment of the present application.

(S2) A spatial position of a model of the LSP robot 300, a model of a clamp 310 and a model of the superalloy turbine disk 100 is input into a simulation system software of the LSP robot 300 according to a spatial position data of the LSP robot 300, the clamp 310 and the superalloy turbine disk 100, in which the simulation system software includes the model of the LSP robot 300, the model of the clamp 310 and the model of the superalloy turbine disk 100. The clamp 310 is arranged at an end of an arm of the LSP robot 300. The clamp 310 is configured to clamp the superalloy turbine disk 100. The LSP robot 300 is configured to drive the clamp 310, as shown in FIG. 12. In this embodiment, a spatial position of the model of the laser beam 200 is input into the simulation system software of the robot, according to a spatial position data corresponding to it.

Figure 11:
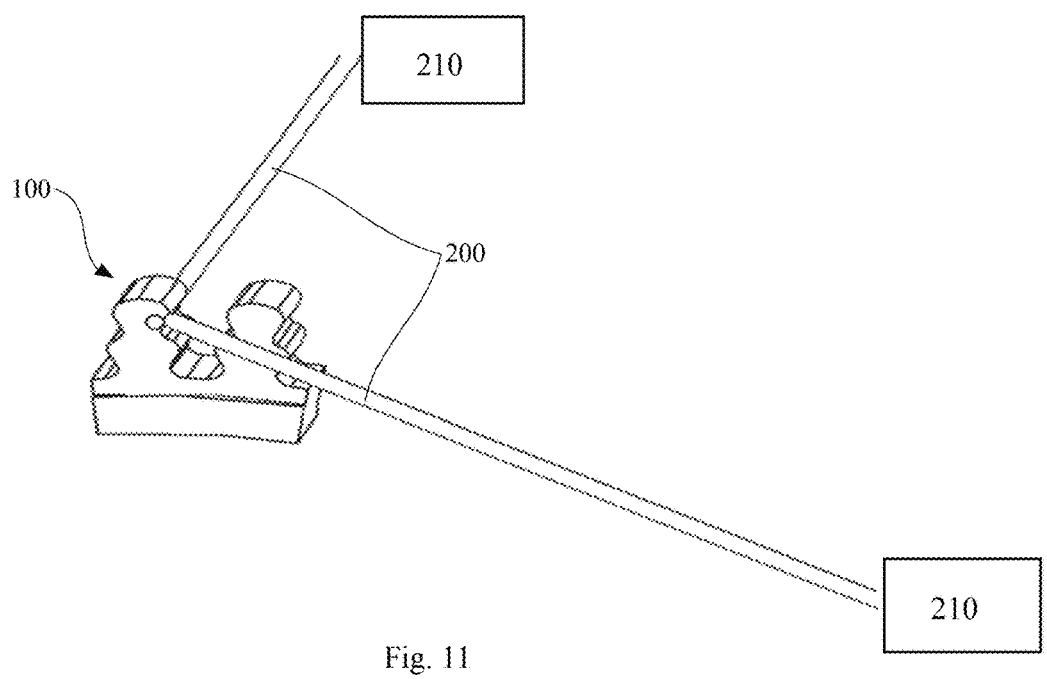
FIG. 11 schematically shows laser beam irradiation to the mortise of the turbine disk.

(S3) A spatial data of a motion trajectory of the LSP robot 300 for a laser shock peening area of all mortise teeth of a first mortise 110 is found and recorded to generate a trajectory program of the LSP robot 300 for the first mortise using the simulation system software of the LSP robot 300 according to the LSP parameter of the LSP robot 300 designed in step (S1) (as shown in FIG. 11). In this embodiment, the simulation system software of the LSP robot 300 is configured to find and record a spatial data of the motion trajectory of the LSP robot 300 for laser shock peening areas of the first mortise tooth part 111, the second mortise tooth part 112, and the mortise groove 113 of the first mortise 110.

(S4) An included angle between two adjacent mortises 110 is calculated according to the number of the mortises 110 of the superalloy turbine disk 100. A rotation program of the end of the arm of the LSP robot 300 is written according to the included angle. In this embodiment, the included angle β between the two mortises 110 is calculated to be $360/n°$, according to the number of the mortises 110 being n. The rotation program of the end of the arm of the LSP robot 300 is written according to the included angle.

(S5) The trajectory program of the LSP robot 300 generated in step (S3) and the rotation program of the end of the arm of the LSP robot 300 are subjected to permutation and combination to generate a trajectory program of the LSP robot 300 for all mortises 110 of the superalloy turbine disk 100.

(S6) The mortises 110 of the superalloy turbine disk 100 by using laser shock peening is processed by a laser 210, in which a LSP parameter of the laser 210 is adjusted for positions with different heights on the mortise tooth in each of the mortises 110 of the superalloy turbine disk 100 and the LSP parameter of the laser 210 includes a laser energy intensity, a laser spot size, a laser pulse width and a laser pulse frequency. In this embodiment, when the first mortise tooth part 111, the second mortise tooth part 112, and the mortise groove 113 of the first mortise 110 is processed by laser shock peening, the LSP parameter of the laser 210 is adjusted for the first mortise tooth part 111, the second mortise tooth part 112, and the mortise groove 113 of the first mortise 110.

(S7) The mortises 110 of the superalloy turbine disk 100 are processed by laser shock peening according to the trajectory program of the LSP robot 300 obtained in step (S5) and the LSP parameter of the laser 210.

The front LSP area and the rear LSP area of the positions with the same height on a mortise tooth have the same incident angles of the laser beam 200 and the same parameters in laser shock peening.

The laser shock peening parameters for the first mortise tooth part 111, the second mortise tooth part 112 and the mortise groove 113 of the mortise 110 are determined, according to the technical indicators of the mortise 110 of the turbine disk 100, the structural characteristics of the mortise 110 and the obtained oblique shock angles. The technical indicators of the mortise 110 include the working temperature of the turbine disk 100 and the pressure applied to the turbine disk 100. In this embodiment, the determination of the parameters in laser shock peening includes selecting the appropriate laser energy intensity, laser spot size, laser pulse width, laser pulse frequency and laser spot overlap rate.

The mortise 110 of the turbine disk 100 is processed by laser shock peening, and the effect of laser shock peening is verified, according to the obtained trajectory program of the LSP robot 300 and the LSP parameter of the laser 210.

The clamp 310 and the turbine disk 100 are kept fixed during the laser shock peening. In this embodiment, the clamp 310 only needs to be positioned and clamped to the turbine disk 100 once, so that all the mortises 110 of the turbine disk 100 can be processed by laser shock peening.

The laser shock peening method provided herein can reduce the time consumed for online debugging and programming of the robot, improve the working efficiency of the robot, and reduce the human error in the online debugging.

By means of the laser shock peening method provided herein, the laser shock peening treatment of various small-size and structurally-complex turbine disk 100 with narrow space is realized and the problem of poor laser beam accessibility is solved.

By means of the laser shock peening method provided herein, the LSP parameter for each laser shock peening area can be accurately quantified, which realizes the variable parameter laser shock peening and improves the processing flexibility.

By means of the method of the offline programming, the problem such as stress concentration caused by adopting uniform LSP parameter for positions with different heights on a mortise tooth in the same mortise 110 is prevented, which truly improves the working life and stability of the turbine disk 100.

The above embodiments are only used to illustrate the objectives, technical solutions, and beneficial effects of this disclosure, and are not intended to limit the present disclosure. It should be understood that any modifications, replacements and improvements made by those skilled in the art without departing from the spirit of this application should fall within the scope of this application defined by the appended claims.

What is claimed is:

1. A method for processing a mortise of a superalloy turbine disk using laser shock peening, comprising:
    (S1) according to a structural characteristic and a dimensional data of the mortises of the superalloy turbine disk, designing a laser shock peening (LSP) parameter of a laser shock peening (LSP) robot, wherein different LSP parameters and different oblique beam incident angles are adopted for positions with different heights on a mortise tooth in the same mortise;
    (S2) inputting a spatial position of a model of the LSP robot, a model of a clamp and a model of the superalloy turbine disk into a simulation system software of the LSP robot according to a spatial position data of the LSP robot, the clamp and the superalloy turbine disk, wherein the simulation system software comprises the model of the LSP robot, the model of the clamp and the model of the superalloy turbine disk; the clamp is arranged at an end of an arm of the LSP robot; the clamp is configured to clamp the superalloy turbine disk; and the LSP robot is configured to drive the clamp;
    (S3) finding and recording a spatial data of a motion trajectory of the LSP robot for a laser shock peening area of all mortise teeth of a first mortise to generate a trajectory program of the LSP robot for the first mortise using the simulation system software of the LSP robot according to the LSP parameter of the LSP robot designed in step (S1);
    (S4) calculating an included angle between two adjacent mortises according to the number of the mortises of the superalloy turbine disk; and writing a rotation program of the end of the arm of the LSP robot according to the included angle;

(S5) subjecting the trajectory program of the LSP robot generated in step (S3) and the rotation program of the end of the arm of the LSP robot to permutation and combination to generate a trajectory program of the LSP robot for all mortises of the superalloy turbine disk;

(S6) processing, by a laser, the mortises of the superalloy turbine disk by using laser shock peening; wherein a LSP parameter of the laser is adjusted for positions with different heights on the mortise tooth in each of the mortises of the superalloy turbine disk, and the LSP parameter of the laser comprises a laser energy intensity, a laser spot size, a laser pulse width and a laser pulse frequency; and (S7) processing the mortises of the superalloy turbine disk by laser shock peening according to the trajectory program of the LSP robot obtained in step (S5) and the LSP parameter of the laser.

2. The method of claim 1, wherein a spatial data of a motion trajectory of the LSP robot for a laser shock peening area of a mortise groove of the mortises is determined by using a perpendicular incident laser beam.

3. The method of claim 1, wherein the clamp and the superalloy turbine disk are kept fixed during the laser shock peening.

* * * * *